(12) United States Patent
Tard et al.

(10) Patent No.: US 9,843,050 B2
(45) Date of Patent: Dec. 12, 2017

(54) FORMULATION OF AN ACTIVE LAYER HAVING IMPROVED PERFORMANCES

(71) Applicant: Commissariat A L'Energie Atomique Et Aux Energies Alternatives, Paris (FR)

(72) Inventors: Julien Tard, Saint Quentin Fallavier (FR); Joël Pauchet, Saint Martin d'Uriage (FR); Rémi Vincent, Grenoble (FR)

(73) Assignee: Commissariat A L'Energie Atomique Et Aux Energies Alternatives, Paris (FR)

( * ) Notice: Subject to any disclaimer, the term of this patent is extended or adjusted under 35 U.S.C. 154(b) by 0 days.

(21) Appl. No.: 14/625,136

(22) Filed: Feb. 18, 2015

(65) Prior Publication Data

US 2015/0180041 A1 Jun. 25, 2015

Related U.S. Application Data

(63) Continuation of application No. PCT/FR2013/052046, filed on Sep. 5, 2013.

(30) Foreign Application Priority Data

Sep. 6, 2012 (FR) ...................................... 12 58331

(51) Int. Cl.
| | |
|---|---|
| *H01M 4/88* | (2006.01) |
| *H01M 4/92* | (2006.01) |
| *H01M 4/94* | (2006.01) |
| *H01M 8/10* | (2016.01) |
| *H01M 8/102* | (2016.01) |
| *H01M 4/86* | (2006.01) |
| *C09D 11/106* | (2014.01) |
| *H01M 8/1039* | (2016.01) |
| *H01M 8/1018* | (2016.01) |

(52) U.S. Cl.
CPC ........... *H01M 4/881* (2013.01); *C09D 11/106* (2013.01); *H01M 4/8668* (2013.01); *H01M 4/8828* (2013.01); *H01M 4/926* (2013.01); *H01M 4/94* (2013.01); *H01M 8/102* (2013.01); *H01M 8/1039* (2013.01); *H01M 4/8807* (2013.01); *H01M 2008/1095* (2013.01)

(58) Field of Classification Search
None
See application file for complete search history.

(56) References Cited

FOREIGN PATENT DOCUMENTS

| EP | 1 336 996 A1 | 8/2003 |
|---|---|---|
| JP | 2006-286330 A1 | 10/2006 |
| JP | 2011-113739 A1 | 6/2011 |
| WO | 2006/029185 A2 | 3/2006 |

OTHER PUBLICATIONS

C. Zaluski et al., "Blends of Nafion and Dow Perfluorosulfonated Ionomer Membranes," Macromolecules, American Chemical Society, vol. 27, No. 23, Jan. 1, 1994, pp. 6750-6754.

Chao Lei, et al., "Low Equivalent Weight Short-Side-Chain Perfluorosulfonic Acid Ionomers in Fuel Cell Cathode Catalyst Layers," Journal of Power Sources, vol. 196, No. 15, Mar. 12, 2011, pp. 6168-6176.

A. Stassi, et al., "Performance Comparison of Long and Short-Side Chain Perfluorosulfonic Membranes for High Temperature Polymer Electrolyte Membrane Fuel Cell Operation," Journal of Power Sources, vol. 196, No. 21, Dec. 17, 2010, pp. 8925-8930.

Jennifer Peron, et al., "Fuel Cell Catalyst Layers Containing Short-Side-Chain Perfluorosulfonic Acid Ionomers," Journal of Power Sources, vol. 196, No. 1, Jan. 1, 2011, pp. 179-181.

Daniel Brandell, et al., "Molecular Dynamics Studies of the Nafion®, Dow®, and Aciplex® Fuel-Cell Polymer Membrane Systems," Journal of Molecular Modeling, vol. 13, No. 10, Jul. 31, 2007, pp. 1039-1046.

A.S. Arico et al., "High Temperature Operation of a Solid Polymer Electrolyte Fuel Cell Stack Based on a New Ionomer Membrane", Fuel Cells, vol. 10, No. 6, Nov. 3, 2010, pp. 1013-1023 (Abstract Only).

International Search Report (Application No. PCT/FR2013/052046) dated Dec. 4, 2013.

International Preliminary Report on Patentability (Application No. PCT/FR2013/052046) dated Jun. 4, 2014.

*Primary Examiner* — Ladan Mohaddes
(74) *Attorney, Agent, or Firm* — Burr & Brown, PLLC

(57) ABSTRACT

An active layer for a proton-exchange membrane fuel cell (PEMFC) including at least two perfluorosulfonate ionomers.

20 Claims, 2 Drawing Sheets

FORMULATION OF AN ACTIVE LAYER HAVING IMPROVED PERFORMANCES

FIELD OF THE INVENTION

The present invention relates to the field of electrochemical devices, in particular of fuel cells, particularly of proton-exchange membrane fuel cells (PEMFC).

More specifically, the invention relates to the use of a mixture of perfluorosulfonate ionomers (PFSA) to manufacture catalytic layers of such cells, enabling to significantly increase the performances thereof.

BACKGROUND

The operating principle of proton-exchange membrane fuel cells (PEMFC) is based on the conversion of chemical energy into electric energy by catalytic reaction between a fuel, for example, hydrogen, and an oxidizer, for example, oxygen.

Membrane-electrode assemblies (MEA), commonly called cell cores, form the basic elements of PEMFCs. As illustrated in FIG. 1, a MEA is generally formed of a polymer membrane (electrolyte, 3) in contact with a catalytic layer (electrodes, 2) on both sides. The electrodes, respectively called anode and cathode, are thus separated by the electrolyte which is an electronically-insulating proton-conducting medium. Current collectors (1) ensure the electron transfer at the external surface of the electrodes. Further, gas diffusion layers are arranged on either side of the MEA to ensure an electric conduction, the homogeneous distribution of the reactant gases, and the discharge of the produced water.

In the case of proton-exchange membrane fuel cells, the electrolyte generally is a membrane made of a cation-exchange polymer, such as Nafion® (Dupont) or Aquivion® (Solvay).

The fuel used in proton-exchange membrane fuel cells may be a gas, such as hydrogen, or a liquid, such as for example an alcohol, particularly ethanol, methanol, or also ethylene glycol.

The following reactions, given as an example, illustrate the electrochemical reactions occurring at the electrodes in the case where the fuel and the oxidizer respectively are hydrogen and oxygen:

Anode: $H_2 \rightarrow 2H^+ + 2e^-$ (1)

Cathode: $O_2 + 4H^+ + 4e^- \rightarrow 2H_2O$ (2)

In this case, the general reaction thus is the following:

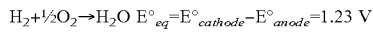

The electromotive force across the cell thus is 1.23 V in standard conditions.

At the anode, the decomposition of the hydrogen adsorbed on the catalyst generates protons $H^+$ and electrons $e^-$. The protons then cross the polymer membrane before reacting with oxygen at the cathode. The reaction of the protons with oxygen at the cathode results in the forming of water and in the production of heat.

Such electrochemical reactions are kinetically promoted by the presence of a catalyst forming the electrodes. Although a plurality of materials may be used according to the type of reaction and of fuel, platinum is the most efficient for most reactions and fuels.

As already indicated, the catalyst may appear in the form of catalytic layers, which are generally made of platinum nanoparticles supported on carbon clusters. The catalyst may be uniformly deposited by means of a catalytic ink on the membrane surface or on the diffusion layer. The catalytic ink is particularly made of the catalyst supported on carbon (platinum-on-carbon), a carrier fluid, and a proton-conducting polymer. The latter is generally of same nature as the electrolyte.

The proton-conducting polymer mainly plays a role in the cell performances, since it determines the proton conductivity of the cell. It is an ionomer, that is, a polymer having an ionized group allowing a charge transport.

Initially, the ionomers used to be sulfonated phenols, and then polystyrene sulfonic acid polymers, which are more mechanically resistant. Currently, perfluoro sulfonic acid materials (PFSA) are widely used in present fuel cells, due to their good chemical and mechanical resistances.

PFSAs are ionomers derived from perfluorosulfonic acid, that is, comprising sulfonate groups $SO_3^-$. They further are fluorinated polymers.

This family of ionomers gathers a number of compounds, which differ by a slightly different chemistry. PFSA materials are commercialized under trade names Nafion® (Dupont), Aquivion® (Solvay), Flemion® (Asahi Glass Company), or Aciplex® (Asahi Chemical Company). As an example, the partial structure of Aquivion® (Solvay) is illustrated in FIG. 2.

As can be observed, these polymers essentially differ by the chemical structure of their side or dangling chains, that is, the chains grafted on the main chain of the polymer (or branchings).

Thus, the side or dangling chains of Aquivion® are shorter ("short side-chains") than those of Nafion® ("long side-chains"). This translates as a higher crystallinity rate and vitreous transition temperature.

Further, Aquivion® has a lower equivalent mass. Hydrophilic groups are thus by a larger number for a sane mass, which gives it a stronger hydrophilic character. This property provides a better proton conductivity, due to a larger number of sulfonated sites, which improves properties at low humidity.

The chemical characteristics of such PFSA ionomers thus have an impact on the operation of the cells containing them.

Thus, Nafion® provides good performances whatever the relative humidity of the gases. Aquivion®, however, has better performances than Nafion® at a low relative humidity, which may make it advantageous in such conditions. However, the use of Aquivion® as a proton-conducting polymer raises an issue at high humidity, with significant drops in activation performances. Arico et al. ("*High temperature operation of a solid polymer electrolyte fuel cell stack based on a new ionomer membrane*", Fuel Cells 10, 2010, No. 06, 1013-1023) have also shown that Aquivion® is better than Nafion® at medium temperatures, in the order of 100-110° C.

As appears from the foregoing, the different currently-available PFSAs each have advantages and drawbacks. Another important parameter capable of hindering their use relates to their cost.

There thus is an obvious need to provide new proton conduction polymers usable in the context of PEMFCs, particularly at the level of their catalytic layers.

SUMMARY OF THE INVENTION

The present invention is based on the highlighting by the Applicant that, surprisingly, the general performance of a proton-exchange membrane fuel cell may be improved by the use of an active layer comprising a mixture of at least two PFSA-type ionomers.

Thus, and according to a first aspect, the present invention relates to an active layer for an electrochemical device comprising at least two perfluorosulfonate ionomers.

A preferred electrochemical device according to the invention is a fuel cell, advantageously a proton-exchange membrane fuel cell or PEMFC.

In the context of the invention, the layer comprising the catalyst is called active layer or catalytic layer. In the context of a fuel cell, the active or catalytic layer is used as an electrode, that is, as a cathode as well as an anode. According to a preferred embodiment, the active layer according to the invention is used as a cathode.

Advantageously, the catalyst is platinum. Further, the catalyst advantageously appears in the form of particles or even of nanoparticles, particularly of platinum. According to another preferred embodiment, the catalyst is supported on carbon or on carbon clusters. The catalyst may thus be platinum-on-carbon.

Typically according to the invention, the catalyst is thus associated with at least two perfluorosulfonate ionomers in the active layer.

In the meaning of the invention, a perfluorosulfonate ionomer should be understood as a perfluorinated polymer supporting sulfonic acid functions, or PFSA, as defined hereabove.

According to the invention, two polymers of different nature and thus of different chemical structure should thus be used. It may of course be envisaged to associate a greater number thereof.

In particular, and preferably, the at least two polymers differ by the nature or the structure of their side or dangling chain, advantageously by the length thereof. To assess the "length", the total number of atoms forming this chain, or possibly the number of carbon atoms in this chain, may be taken into account.

Thus, and advantageously, the first polymer has a longer dangling chain than the second one. In other words, the second perfluorosulfonate ionomer has a shorter dangling chain than the first perfluorosulfonate ionomer.

According to this embodiment, the first perfluorosulfonate ionomer advantageously has a long side-chain.

A particularly adapted ionomer is a sulfonated tetrafluoroethylene derivative, for example sold under trade name Nafion® (Dupont). As an example, product Nafion® D2020 having number CAS 31175-20-9 may be used in the framework of the present invention, but others exist.

The partial structure of such an ionomer is illustrated in FIG. 2 and is characterized by dangling chains having 5 carbon atoms. Thus, and advantageously according to the invention, the first perfluorosulfonate ionomer has a side chain comprising at least five carbon atoms.

According to a specific embodiment, the first ionomer advantageously has the following structure:

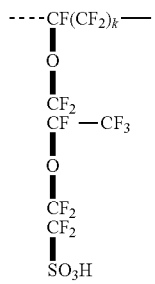

In the following description, k should be understood as an integer.

Advantageously, the second polymer associated with the first polymer differs by the shorter length of its side chain ("short side-chain").

A particularly adapted ionomer is a tetrafluoroethylene and Sulfonyl Fluoride Vinyl copolymer, for example, sold under trade name Aquivion® (Solvay), particularly under number CAS 111173-25-2.

The partial structure of such an ionomer is illustrated in FIG. 2 and is characterized by dangling chains having 2 carbon atoms. Thus, and advantageously according to the invention, the second perfluorosulfonate ionomer has a side chain comprising less than five carbon atoms.

Such a second ionomer advantageously has the following partial structure:

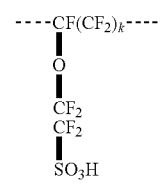

As appears, the mixture of perfluorosulfonate ionomers according to the invention is advantageously made of or advantageously comprises a Nafion®-type polymer and an Aquivion®-type polymer.

In other words, and advantageously, the active layer according to the invention comprises:

a first ionomer having the following structure:

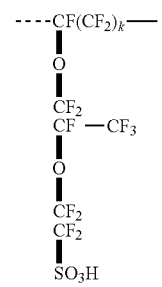

and a second ionomer having the following structure:

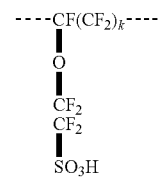

Indeed, and in the context of the invention, it has been shown that the combination of Nafion® and of Aquivion® in the active layers of a cell, advantageously in its cathode, creates a synergy and enables to increase the cell performance over the two respective ionomers taken alone. Thus, the mixture of two ionomers from the family of PFSAs enables to create a synergy which results in performances greater than those of each of the two ionomers alone.

Accordingly, the different combinations between the available PFSAs may be envisaged, particularly implying Flemion® (Asahi Glass Company) or Aciplex® (Asahi Chemical Company).

In the context of the invention, the test advantageously implemented to highlight a possible synergy between at least two perfluorosulfonate ionomers comprises monitoring the electrochemical performances of a cell comprising such ionomers. The performances are measured by monitoring the voltage delivered according to the current. This test is generally implemented in conditions desirable in the automotive field (Temperature: 80° C.; 50% of relative humidity; Pressure: 1.5 bar) but may be adapted to the operating conditions envisaged for the electrochemical device in presence.

Generally, the mixture of at least two polymers in the meaning of the invention is considered as advantageous when the voltage is greater than or equal to, for a given current and in given conditions, those measured with at least one of the ionomers used alone, or even with each of the ionomers used alone. For equal performances, the price of the ionomers may also be taken into account. Thus, and as an example, Nafion® being more expensive than Aquivion®, it may be advantageous to use a mixture of the two, even if the performances of the mixture are equivalent to those of Nafion® alone.

According to another aspect and advantageously, the relative concentration of the first ionomer (advantageously having the longest dangling chain and more advantageously still of Nafion® type) relative to the total ionomers is greater than or equal to 50% by weight of dry matter, advantageously in the range from 50 to 80%. The relative concentration of the second ionomer (advantageously having the shortest dangling chain and more advantageously still of Aquivion® type) relative to the total ionomers is then smaller than or equal to 50% by weight of dry matter, advantageously in the range from 20 to 50% by weight of dry matter. In the context of the invention, the concentration should thus be understood as the quantity of dry matter of an ionomer relative to the total quantity of ionomers ("total ionomers").

More advantageously still, the relative concentration of the first ionomer is in the range from 60 to 70% by weight of dry matter and the relative concentration of the second ionomer is in the range from 30 to 40% by weight of dry matter.

Thus, and as an example, the first ionomer, advantageously comprising the following structure:

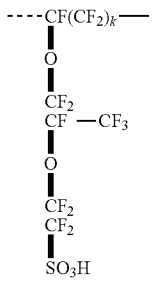

may amount to 70% by weight of the mixture of ionomers, while the second ionomer, advantageously comprising the following structure:

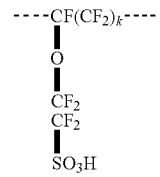

may amount to 30% by weight of the mixture of ionomers.

The above-mentioned performance test may be easily implemented by those skilled in the art on a case by case basis to determine, in the presence of a given mixture of perfluorosulfonate ionomers, the advantageous proportion of each of these ionomers.

In addition to this mixture of perfluorosulfonate ionomers, an active layer according to the invention comprises a catalyst, advantageously platinum nanoparticles on a carbonaceous support, typically made of 50% of carbon and of 50% of platinum (% by mass in the dry catalytic layer). Conventionally and as an example, the active layer is made of 75% catalyst and of 25% of perfluorosulfonate ionomer(s).

According to another aspect, the invention relates to a catalytic ink comprising at least two perfluorosulfonate ionomers such as described hereabove.

As a reminder, the catalytic layer may be obtained by deposition of the catalytic ink, particularly on the membrane or on the diffusion layer.

Conventionally, the catalytic ink comprises, in addition to the mixture of perfluorosulfonate ionomers according to the invention and the catalyst, advantageously platinum nanoparticles on a carbonaceous support, a solvent, or a carrier fluid.

As known by those skilled in the art, such a catalytic ink may be deposited by printing methods such as coating, sputtering, inkjet, or silk-screening.

An active layer or a catalytic ink such as described hereabove may be used in the forming of electrochemical devices, such as fuel cells and more particularly proton-exchange membrane fuel cells (PEMFC), or of MEAs.

Thus, the present invention also aims at electrochemical devices comprising an active layer according to the invention. The targeted electrochemical devices comprise, first and foremost, fuel cells and more particularly proton-exchange membrane fuel cells (PEMFC).

According to another aspect of the invention, such an active layer may be integrated in a membrane-electrode assembly or MEA where it plays the role of an electrode. Thus, although an active layer according to the invention may be used as an anode as well as a cathode, it is advantageously used as a cathode.

By definition, a MEA according to the invention thus at least comprises:
- a polymer membrane;
- a cathode formed of an active layer according to the invention, that is, comprising at least two perfluorosulfonate ionomers;
- an anode possibly formed of an active layer according to the invention.

Advantageously, the polymer membrane is made of one of the two perfluorosulfonate ionomers of the active layer, advantageously of the first perfluorosulfonate ionomer having the following structure:

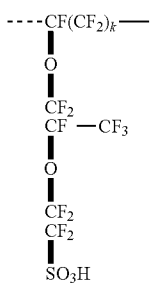

In the case where the anode comprises no active layer according to the invention, it is advantageously made of the same ionomer as the membrane, that is, advantageously one of the first perfluorosulfonate ionomers of the active layer, advantageously of the first perfluorosulfonate ionomer, having the following structure:

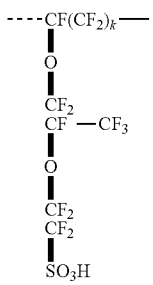

A MEA according to the invention may be integrated in a fuel cell, advantageously in a proton-exchange membrane fuel cell (PEMFC).

As shown in the context of the present application, an active layer according to the invention enables to improve the performances of a PEMFC-type fuel cell.

BRIEF DESCRIPTION OF THE DRAWINGS

The foregoing features and advantages will now be discussed in the following non-limiting description of a specific embodiment, in relation with the accompanying drawings, among which.

EMBODIMENTS OF THE INVENTION

I/Forming of the Devices:

The forming of the MEA (Membrane-Electrode Assembly) is carried out in three steps:
- the first step comprises preparing the catalytic ink, comprising the ionomer(s) and the catalyst on a carbonaceous support, in a solvent.
- the second step is the manufacturing of the electrode by deposition of the ink on the diffusion layer, according to a method described hereafter.
- the last manufacturing step is the assembly of two electrodes (cathode and anode) with, in the middle, a membrane generally made of the same polymer as one of the ionomers present in the active layer.

a/Device According to the Invention:

According to the invention, the composition of the anode differs from that of the cathode. The following percentages should be understood by mass, in the dry catalytic layer:

The anode is made of 75% of catalyst (containing 50% of carbon and 50% of platinum) and of 25% of ionomer.

The cathode is generally made of 75% of the same catalyst, of 18% of the first ionomer, preferably Nafion® and of 7% of the second ionomer, preferably Aquivion®.

The membrane is a Nafion®-type membrane.

A water-based catalytic ink is prepared to obtain these concentrations. According to the manufacturing method, the dry extract varies from 1% to 20%. A thermal treatment enables to dry the deposited ink.

The assembly of the anode and of the cathode, with a membrane in the middle, provides the MEA. It takes place in a press, according to temperature, pressure, and duration conditions variable according to the membrane used.

The MEA thus obtained, having a 25-cm$^2$ surface area, is assembled in a single cell to test the performances. The single cell is fitted with monopolar plates allowing the incoming of gases, with current collection plates, and with clamping plates.

Figure 1:
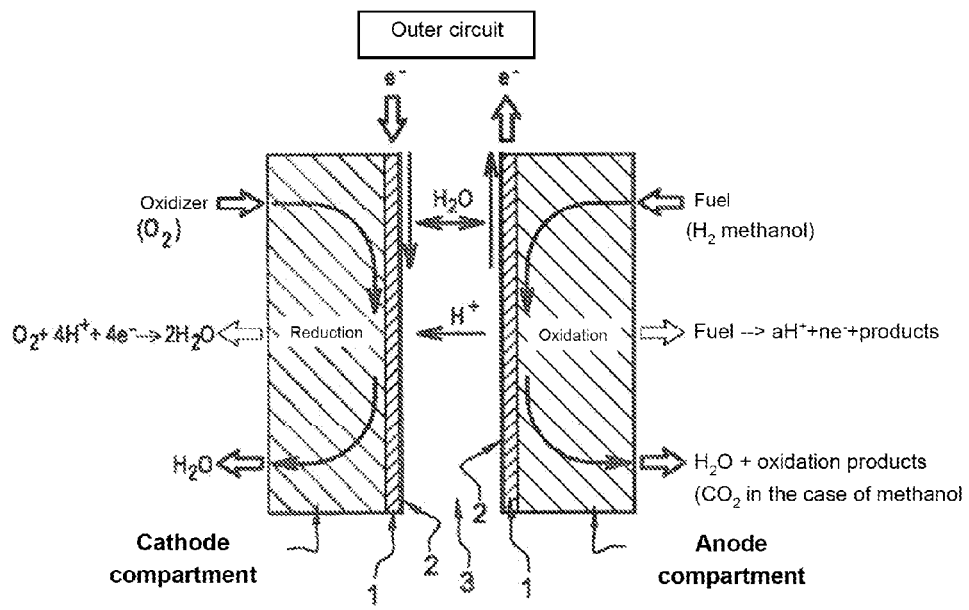
FIG. 1 shows the diagram of the operating principle of a PEMFC-type fuel cell.
Figure 2:
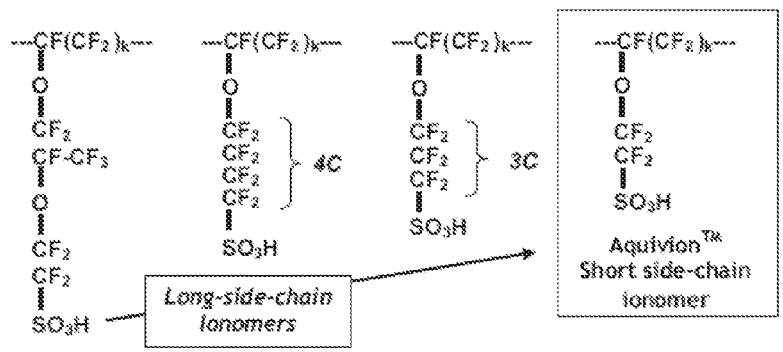
FIG. 2 shows the structure of the dangling chains of perfluorosulfonate ionomers (on the left-hand side, Nafion®, on the right-hand side, Aquivion®).

The structure of the used Nafion® (supplied by Dupont) and Aquivion® (supplied by Solvay) is illustrated in FIG. 2.

b/Prior Art Devices (Nafion® Alone or Aquivion® Alone):

The manufacturing protocol of a MEA containing a single ionomer is the same as hereabove. The only difference is the cathode manufacturing. The latter is made of the same materials as the anode, that is, 75% of catalyst, and 25% of ionomer.

II/Performances of the Devices:

The performances of the devices are studied in conditions close to those recommended for an automotive use.

The operating temperature is 80° C. The relative humidity varies from 50% to 80%. The gas pressure is 1.5 bar.

The test starts with a measurement of the rest potential. A current is then imposed, from 0 to 2 A/cm$^2$, and the potential is measured. The result is a voltage-vs.-current curve representative of the cell performances.

Figure 3:
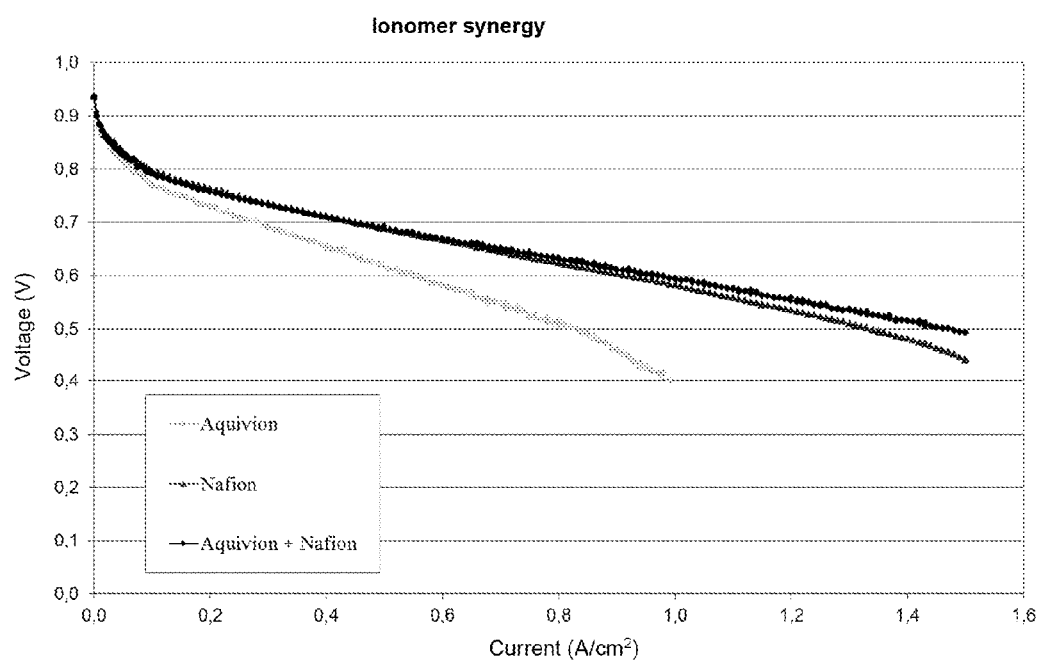
FIG. 3 compares the performances of a device according to the invention (mixture of Aquivion® and Nafion®) and of prior art devices (Aquivion® or Nafion® alone).

The results are shown in FIG. 3. In the cell operating conditions, the mixture of Nafion® (70% concentration) and Aquivion® (30% concentration) enables to exceed the performances of Nafion® alone.

The invention claimed is:

1. An active layer for a proton-exchange membrane fuel cell (PEMFC) comprising a catalyst and a mixture of at least a first perfluorosulfonate ionomer and a second perfluorosulfonate ionomer,
the first perfluorosulfonate ionomer having a first dangling chain,
the first perfluorosulfonate ionomer having the following structure:

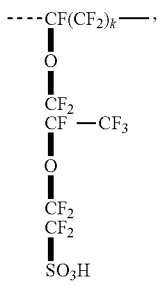

wherein k is an integer,
the second perfluorosulfonate ionomer having a second dangling chain,
and wherein the second dangling chain is shorter than the first dangling chain.

2. The active layer for a proton-exchange membrane fuel cell (PEMFC) of claim 1, wherein the second perfluorosulfonate ionomer has the following structure:

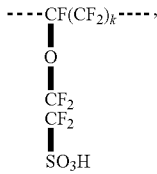

wherein k is an integer.

3. The active layer for a proton-exchange membrane fuel cell (PEMFC) of claim 1, wherein the relative concentration of the first ionomer is in the range from 50 to 80% by weight of a combined amount of the first ionomer and the second ionomer as dry matter, and wherein the relative concentration of the second ionomer is in the range from 20% to 50% by weight of said dry matter.

4. The active layer for a proton-exchange membrane fuel cell (PEMFC) of claim 3, wherein the relative concentration of the first ionomer is in the range from 60 to 70% by weight of a combined amount of the first ionomer and the second ionomer as dry matter, and wherein the relative concentration of the second ionomer is in the range from 30 to 40% by weight of said dry matter.

5. The active layer for a proton-exchange membrane fuel cell (PEMFC) of claim 1, wherein the catalyst comprises platinum nanoparticles on a carbonaceous support.

6. A membrane-electrode assembly (MEA), wherein at least one of an anode of the MEA and a cathode of the MEA comprises an active layer as recited in claim 1.

7. The membrane-electrode assembly (MEA) of claim 6, wherein a membrane of the MEA is made of one of the first and second perfluorosulfonate ionomers.

8. A proton-exchange membrane fuel cell (PEMFC) comprising the membrane-electrode assembly (MEA) of claim 6.

9. A proton-exchange membrane fuel cell (PEMFC) comprising the membrane-electrode assembly (MEA) of claim 7.

10. A proton-exchange membrane fuel cell (PEMFC)-type fuel cell comprising an active layer as recited in claim 1.

11. A membrane-electrode assembly (MEA), wherein a cathode of the MEA comprises an active layer as recited in claim 1.

12. A membrane-electrode assembly (MEA) as recited in claim 6, wherein the anode of the MEA is made of one of the first and second perfluorosulfonate ionomers.

13. A membrane-electrode assembly (MEA) as recited in claim 6, wherein a membrane of the MEA is made of the first perfluorosulfonate ionomer.

14. A membrane-electrode assembly (MEA) as recited in claim 6, wherein the anode of the MEA is made of the first perfluorosulfonate ionomer.

15. A catalytic ink for the forming of an active layer, the catalytic ink comprising;
a mixture of at least a first perfluorosulfonate ionomer and a second perfluorosulfonate ionomer,
the first perfluorosulfonate ionomer having a first dangling chain,
the first perfluorosulfonate ionomer having the following structure:

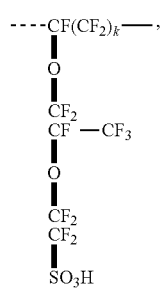

wherein k is an integer,
the second perfluorosulfonate ionomer having a second dangling chain,
and wherein the second dangling chain is shorter than the first dangling chain.

16. The catalytic ink of claim 15, wherein the catalytic ink further comprises a catalyst.

17. The catalytic ink of claim 16, wherein the catalyst comprises platinum nanoparticles on a carbonaceous support.

18. The catalytic ink of claim 16, wherein the catalytic ink further comprises a solvent or carrier fluid.

19. The catalytic ink of claim 17, wherein the catalytic ink further comprises a solvent or carrier fluid.

20. An active layer for a proton-exchange membrane fuel cell (PEMFC) comprising a catalyst and a mixture of at least a first perfluorosulfonate ionomer and a second perfluorosulfonate ionomer,
the first perfluorosulfonate ionomer having a first dangling chain,
the second perfluorosulfonate ionomer having a second dangling chain,
wherein the second dangling chain is shorter than the first dangling chain,
the second perfluorosulfonate ionomer having the following structure:

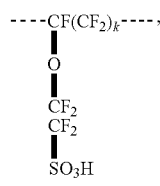

wherein k is an integer.

* * * * *